US012450112B2

United States Patent
Sethi et al.

(10) Patent No.: US 12,450,112 B2
(45) Date of Patent: Oct. 21, 2025

(54) DYNAMIC BEHAVIOR-BASED ADAPTIVE ACCESS CONTROL SYSTEM FOR EDGE DEVICES

(71) Applicant: Dell Products L.P., Round Rock, TX (US)

(72) Inventors: Parminder Singh Sethi, Ludhiana (IN); Shree Rathinasamy, Round Rock, TX (US); Srinath Kappgal, Cork (IE); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/486,307

(22) Filed: Oct. 13, 2023

(65) Prior Publication Data

US 2025/0123915 A1    Apr. 17, 2025

(51) Int. Cl.
  *G06F 15/16* (2006.01)
  *G06F 11/07* (2006.01)
  *H04L 41/06* (2022.01)

(52) U.S. Cl.
  CPC .......... *G06F 11/0751* (2013.01); *H04L 41/06* (2013.01)

(58) Field of Classification Search
  CPC ...................................................... H04L 41/06
  See application file for complete search history.

(56) References Cited

U.S. PATENT DOCUMENTS

| 2023/0297831 A1* | 9/2023 | Saadi | G06N 3/08 706/25 |
| 2024/0029490 A1* | 1/2024 | Albero | G06Q 20/34 |
| 2024/0314566 A1* | 9/2024 | Singh | G01S 13/886 |

OTHER PUBLICATIONS

Solarwinds, "Security Patch Management," https://www.solarwinds.com/patch-manager/use-cases/security-patch-management, Accessed Sep. 27, 2023, 5 pages.

* cited by examiner

*Primary Examiner* — Padma Mundur
(74) *Attorney, Agent, or Firm* — Ryan, Mason & Lewis, LLP

(57) ABSTRACT

A method comprises receiving data corresponding to operation of one or more edge devices, and analyzing the data using one or more machine learning algorithms to determine whether the operation of the one or more edge devices is anomalous. In determining whether the operation of the one or more edge devices is anomalous, the one or more machine learning algorithms determine whether the operation of the one or more edge devices deviates from identified normal operational parameters of the one or more edge devices. At least one action to control access to the one or more edge devices is triggered in response to determining that the operation of the one or more edge devices is anomalous.

20 Claims, 6 Drawing Sheets

DYNAMIC BEHAVIOR-BASED ADAPTIVE ACCESS CONTROL SYSTEM FOR EDGE DEVICES

FIELD

The field relates generally to information processing systems, and more particularly to management of access to edge devices.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. In this manner, for example, network parameters such as bandwidth can be increased, while other network parameters such as latency and congestion can be reduced, thus improving overall network reliability.

The proliferation of edge devices creates security challenges. For example, vulnerabilities in edge device security expose organizations and other entities to threats from unauthorized users. Traditional systems lack the ability to adapt to changing configurations and diverse communication patterns associated with edge devices.

SUMMARY

Embodiments provide a microservices anomaly detection and access control platform in an information processing system.

For example, in one embodiment, a method comprises receiving data corresponding to operation of one or more edge devices, and analyzing the data using one or more machine learning algorithms to determine whether the operation of the one or more edge devices is anomalous. In determining whether the operation of the one or more edge devices is anomalous, the one or more machine learning algorithms determine whether the operation of the one or more edge devices deviates from identified normal operational parameters of the one or more edge devices. At least one action to control access to the one or more edge devices is triggered in response to determining that the operation of the one or more edge devices is anomalous.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
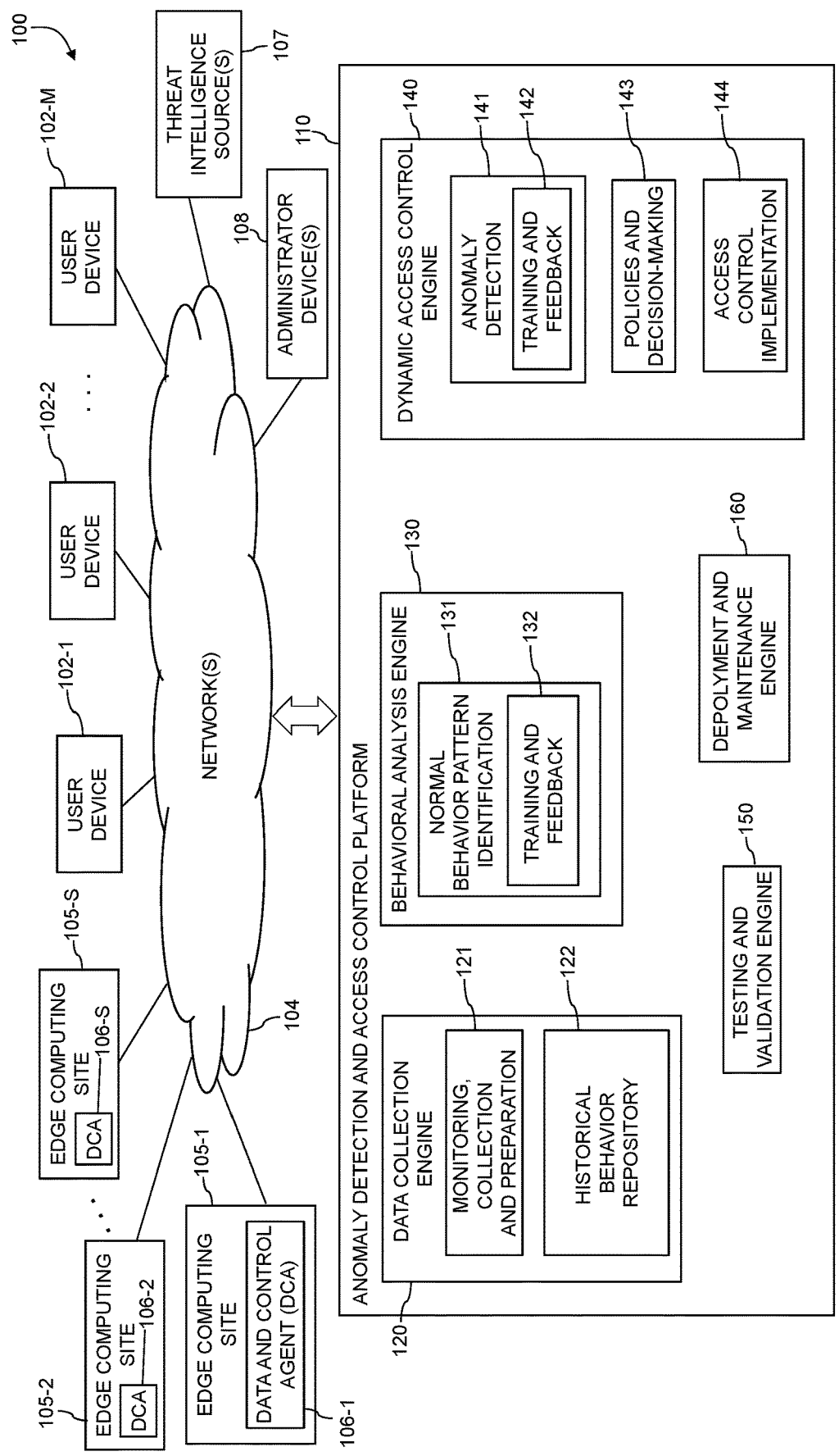
FIG. 1 depicts an information processing system with an anomaly detection and access control platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2, . . . 102-M (collectively "user devices 102"), edge computing sites 105-1, 105-2, . . . 105-S (collectively "edge computing sites 105"), one or more threat intelligence sources 107 and one or more administrator devices 108.

The user devices 102, edge computing sites 105, threat intelligence sources 107 and administrator devices 108 communicate over a network 104 with each other and/or an anomaly detection and access control platform 110. The variable M and other similar index variables herein such as K, L and S are assumed to be arbitrary positive integers greater than or equal to one.

The user devices 102, threat intelligence sources 107 and administrator devices 108 can comprise, for example, Internet of Things (IoT) devices, desktop, laptop or tablet computers, mobile telephones, or other types of processing devices capable of communicating with the anomaly detection and access control platform 110 over the network 104. Such devices are examples of what are more generally referred to herein as "processing devices." Some of these processing devices are also generally referred to herein as "computers." The user devices 102, threat intelligence sources 107 and administrator devices 108 may also or alternately comprise virtualized computing resources, such as virtual machines (VMs), containers, etc. The user devices 102, threat intelligence sources 107 and administrator devices 108 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. Anomaly detection and access control services may be provided for users utilizing one or more machine learning models, although it is to be appreciated that other types of infrastructure arrangements could be used. At least a portion of the available services and functionalities provided by the anomaly detection and access control platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the anomaly detection and access control platform 110, as well as to support communication between the anomaly detection and access control platform 110 and connected devices (e.g., user devices 102, threat intelligence sources 107 and administrator devices 108) and/or other related systems and devices not explicitly shown.

In some embodiments, the administrator devices 108 are assumed to be associated with repair technicians, system administrators, information technology (IT) managers, software developers, release management personnel or other authorized personnel configured to access and utilize the anomaly detection and access control platform 110.

The edge computing sites 105 may each comprise one or more edge stations or other types and arrangements of edge nodes. Each of the edge computing sites 105 illustratively comprises a plurality of edge devices. Each such node of an edge computing site 105 comprises at least one processing device that includes a processor coupled to a memory. The edge computing sites 105 illustratively execute at least portions of various workloads for system users. Such workloads may comprise one or more applications. As used herein, the term "application" is intended to be broadly construed to encompass, for example, microservices and other types of services implemented in software executed by the edge computing sites 105. Such applications can include edge-hosted applications running on the edge computing sites 105. An example edge computing site 105 comprises a set of edge compute, storage and/or network resources. A given such set of edge resources illustratively comprises at least one of compute, storage and network resources of one or more edge devices of the corresponding edge computing site.

Edge compute resources of the edge computing sites 105 can include, for example, various arrangements of processors, possibly including associated accelerators. Edge storage resources of the edge computing sites 105 can include, for example, one or more storage systems or portions thereof that are part of or otherwise associated with the edge computing sites 105. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge network resources of the edge computing sites 105 can include, for example, resources of various types of network interface devices providing particular bandwidth, data rate and communication protocol features.

One or more of the edge computing sites 105 each comprise a plurality of edge devices, with a given such edge device comprising a processing device that includes a processor coupled to a memory. The one or more edge computing sites 105 are each assumed to be implemented using at least one processing device of at least one processing platform. Each such processing device generally comprises at least one processor and an associated memory, and implements at least a portion of the functionality of the edge and core compute, storage and/or network resources. Such processing devices can illustratively include particular arrangements of compute, storage and network resources.

As explained in more detail herein, the edge computing sites 105, more particularly edge devices of the edge computing sites 105 comprise respective data and control agents (DCAs) 106-1, 106-2, . . . 106-S (collectively "data and control agents 106"). The data and control agents 106 comprise software agents and one or more APIs that are deployed on edge devices to, for example, monitor the operation of the edge devices, to collect data corresponding to the operation of the edge devices, to implement access controls for the edge devices and to receive and install software updates corresponding to security of and/or access to the edge devices.

The threat intelligence sources 107 correspond to entities that track and attempt to address, respond to and/or prevent security threats (e.g., hackers, viruses, malware, etc.). The threat intelligence sources 107 may push or make available for downloading information and/or software updates (e.g., software patches) to the edge computing sites 105, administrator devices 108 and/or anomaly detection and access control platform 110. The information and/or software updates may include, for example, descriptions of security threats and their effects on devices (e.g., edge devices), signs of the security threats and ways to detect and/or prevent the security threats, software to detect and prevent the security threats (e.g., anti-virus or anti-malware software), information on the users, parties or devices from which the threats originate and methods by which the threats are implemented.

System behavior and/or operations (e.g., device behavior and/or operations) are not always constant, and instead vary depending on, for example, when the operations are occurring (e.g., day of the week and/or time of day) and whether a security threat (e.g., request for unauthorized access) is being perpetrated. A variety of factors can impact the performance and latency of device operations and their underlying implementing systems. For example, device performance can be impacted by the volume of transactions, numbers of users, amounts of database load, simultaneously running jobs/tasks, etc. Resource issues such as, for example, high central processing unit (CPU) utilization (e.g., CPU utilization percentage), high memory (e.g., RAM) utilization (e.g., memory utilization percentage), high storage utilization (e.g., storage utilization percentage), high volumes of input/output (IO) operations and other spikes in resource usage, as well as network issues, may be the result of incoming security threats. In these instances, "high" may refer to amounts over learned thresholds.

As noted herein above, the proliferation of edge devices creates security challenges and conventional approaches lack the ability to adapt to the changing configurations and diverse communication patterns associated with edge devices. Current approaches lack comprehensive and context-aware security solutions for edge devices, which hinders the adoption of edge computing.

In an attempt to address the above technical problems, the illustrative embodiments provide dynamic, behavior-based adaptive access control system for edge devices. By continuously monitoring edge device behavior in real-time and employing sophisticated behavioral analysis, machine learning, and contextual decision-making, systems of the illustrative embodiments advantageously dynamically adjust access permissions based on recorded behavior. Advanced anomaly detection algorithms trigger swift responsive actions, while integration with threat intelligence sources ensures up-to-date threat mitigation.

In accordance with illustrative embodiments, a data collection engine is implemented to continuously monitor and collect device behavior in real-time. A behavioral analysis engine and a dynamic access control engine utilize machine learning techniques to analyze and understand complex operational data to identify anomalous device behavior. The dynamic access control engine implements access control for edge devices based on the identified anomalous behavior. The dynamic access control engine incorporates contextual information such as, but not necessarily limited to, a location from which a request for access to a device originated, a time of the request for access to the device, and an identity of a user and/or a device issuing the request for access to the device, into access control decisions.

The anomaly detection and access control platform 110 in the present embodiment is assumed to be accessible to the user devices 102, edge computing sites 105, threat intelligence sources 107 and/or administrator devices 108 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the anomaly detection and access control platform 110 includes a data collection engine 120, a behavioral analysis engine 130, a dynamic access control engine 140, a testing and validation engine 150 and a deployment and maintenance engine 160. The data collection engine 120 includes a monitoring, collection and preparation layer 121 and a historical behavior repository 122. The behavioral analysis engine 130 includes a normal behavior pattern identification layer 131 comprising a training and feedback layer 132. The dynamic access control engine 140 includes an anomaly detection layer 141 comprising a training and feedback layer 142, a policies and decision-making layer 143 and an access control implementation layer 144.

Figure 2:
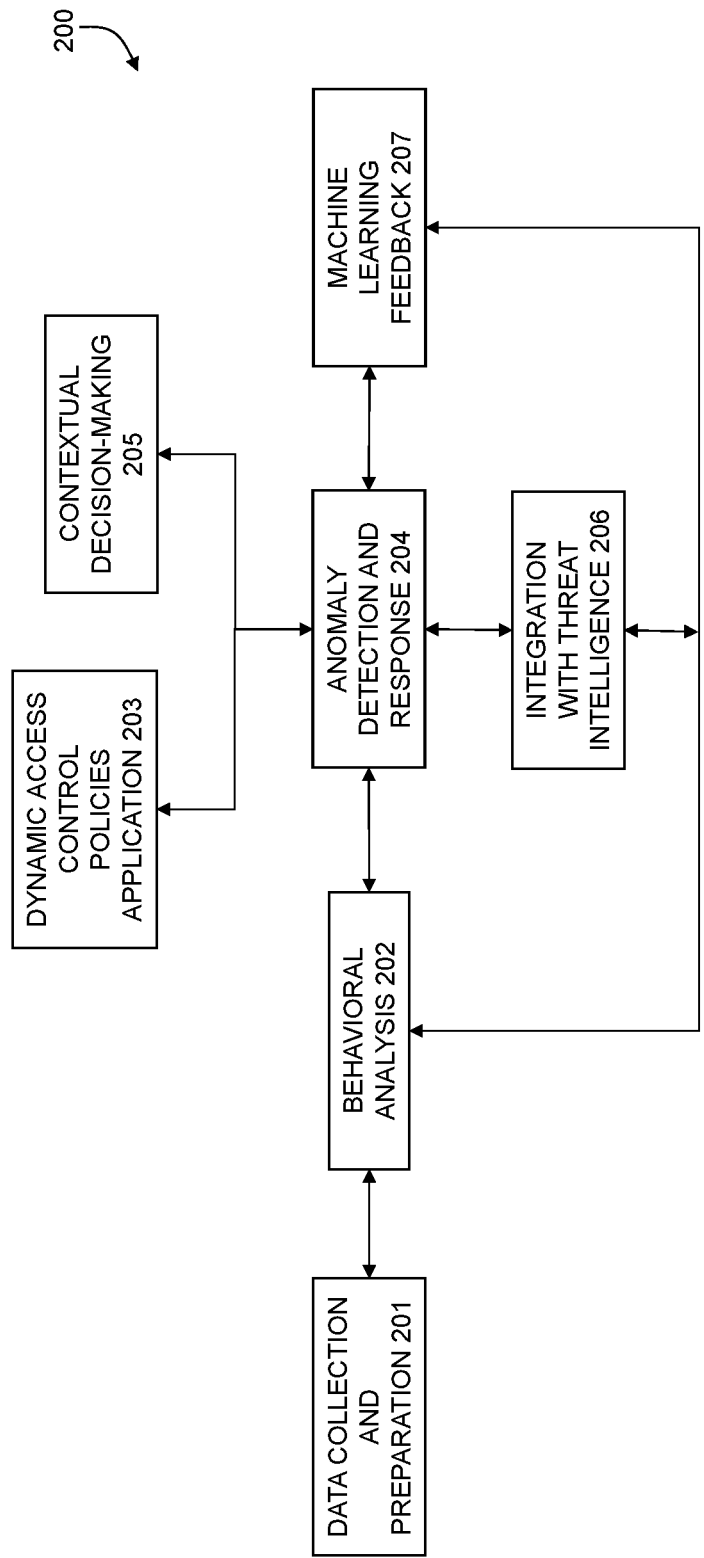
FIG. 2 depicts an operational flow for anomaly detection and access control in an illustrative embodiment.

Referring to FIG. 1, and to block 201 (data collection and preparation) of the operational flow 200 in FIG. 2, the monitoring, collection and preparation layer 121 of the data collection engine 120 collects data corresponding to the operation of one or more edge devices. The edge devices of a given edge computing site 105 may relate to edge compute, storage and/or network resources. The data corresponding to the operation of one or more edge devices comprises, for example, resource usage data by the one or more edge devices, network communications data associated with the one or more edge devices and application execution data of the one or more edge devices. As noted herein above, the edge devices of an edge computing site 105 may each include a software agent (e.g., data and control agent 106) deployed thereon to monitor the operation of its corresponding edge device, to collect the data corresponding to the operation of its corresponding edge device and transmit the collected data over the network 104 to the data collection engine 120.

The data comprises, for example, device identifiers (e.g., device universally unique identifiers (UUIDs)), timestamps (e.g., times of operations and/or of requests for access to the edge devices), input/output (IO) parameters (e.g., throughput, IO operations per second (IOPS), latency), user information, requesting device identifiers, errors associated with a given operation, central processing unit (CPU) utilization, memory utilization and storage utilization of edge devices. The data further comprises, for example, network information including, but not necessarily limited to, network communication patterns (e.g., network volume at particular times), network conditions (e.g., latency, throughput, IOPS) and changes in network volume and/or conditions (e.g., sudden increases in volume/network traffic (e.g., spikes), sudden increases in latency or decreases in throughput and/or IOPs. The data also comprises, for example, information regarding application failures, crashes, errors (e.g., unauthorized users, messages regarding incorrect access credentials, etc.) or other issues with application performance.

As used herein, "operation" or "operations" are to be broadly construed and refer to, for example, transactions initiated by, for example, an invocation, API request or call to an application. The operations include, but are not necessarily limited to, read operations, write operations and/or subroutines used to, for example, perform application functions. The monitoring, collection and preparation layer 121 collects current or real-time operation data and resource utilization data corresponding to operations which are in progress or have been recently completed (e.g., within microseconds or milliseconds). As explained in more detail herein, the collected data, including the corresponding parameters, is inputted to the behavioral analysis engine 130 and to the dynamic access control engine 140 to assess whether the operations are anomalous.

The monitoring, collection and preparation layer 121 also collects historical operational data of the edge devices to train one or more machine learning algorithms used by the normal behavior pattern identification layer 131 to identify the normal operational parameters of the one or more edge devices and/or to train one or more machine learning algorithms used by the anomaly detection layer 141 to identify anomalous operations. The historical operational data relating to normal operations (e.g., when an edge device and/or associated applications, resources and networks are operating without any issues or problems) are stored in the historical behavior repository 122 and input to the behavioral analysis engine 130 to be used as training data by the training and feedback layer 132. In addition, the monitoring, collection and preparation layer 121 further collects and/or receives data corresponding to one or more known security threats to the edge devices from the threat intelligence sources 107. The data regarding the one or more known security threats can be used to train one or more machine learning algorithms used by the normal behavior pattern identification layer 131 to identify the normal operational parameters of the one or more edge devices and/or to train one or more machine learning algorithms used by the anomaly detection layer 141 to identify anomalous operations.

As used herein, "normal operational parameters" refers to, for example, operational data the corresponds to repeated device behavior patterns determined to correspond to regular operation of a device without or with a small number of issues. For example, under normal operating conditions, devices, applications and/or networks may have specific response times. During issues and/or overloaded situations, the response times may vary, and may be considered as outliers or anomalies by the normal behavior pattern identification layer 131. Based on historical operational data, the training and feedback layer 132 of the normal behavior pattern identification layer 131 trains a machine learning model to identify what constitutes normal operational parameters for device operation. Deviations from normal operations found in, for example, real-time operational data, are considered anomalies by the anomaly detection layer 141. As used herein, "anomalous," "anomaly" or "anomalies" refer to deviations from normal operational parameters or normal behavior patterns identified by the normal behavior pattern identification layer 131. By leveraging a large amount of historical operational data for each of a plurality of edge devices and components in normal situations and utilizing an unsupervised machine learning model, normal device behavior and anomalous or outlier device behavior is learned. Using the historical dataset, the machine learning model of the normal behavior pattern identification layer 131 learns, for example, responses and latency, network communication patterns and conditions and the resource states of edge devices in normal situations. Based on the identified normal behavior patterns, the training and feedback layer 142 trains the machine learning algorithms of the anomaly detection layer 141 to identify anomalous behavior when the edge device resource usage data, network communications data associated with the edge devices and/or edge device application execution data deviate from what has been learned as being normal.

The training and feedback layer 132 of the normal behavior pattern identification layer 131 uses, for example, a K-means clustering technique to learn the normal behavior patterns of the edge devices. In more detail, in connection with cluster feature analysis and selection, unsupervised cluster learning is applied to an input dataset using one or more unsupervised machine learning algorithms such as, but not necessarily limited to, a K-means algorithm to generate a plurality of clusters or groups of related normal operational parameters. The number of clusters is optimized, and after identifying the clusters, representative data points in each cluster are selected. The data points are used in connection with statistical analysis to select the most relevant features (e.g., most relevant normal operational parameters) of each cluster through statistical analysis.

Referring back to the operational flow 200 in FIG. 2, following the behavioral analysis 202 performed by the normal behavior pattern identification layer 131 to identify the normal operational parameters of the edge devices, the anomaly detection layer 141 of the dynamic access control engine 140 uses machine learning techniques to analyze real-time data corresponding to the operation of one or more edge devices to determine whether operation of the one or more edge devices is anomalous, wherein in determining whether the operation of the one or more edge devices is anomalous. The anomaly detection layer 141 uses, for example, decision tree techniques including, but not necessarily limited to isolation forest techniques, to determine whether the operation of the one or more edge devices deviates from the normal operational parameters of the one or more edge devices identified by the behavioral analysis engine 130. The anomaly detection layer 141 leverages unsupervised learning methodology for outlier detection of the operation of the one or more edge devices. In an embodiment, the anomaly detection layer 141 implements multivariate anomaly detection using an isolation forest algorithm, which does not require labeled training data. The isolation forest algorithm identifies anomalies among the normal observations, by setting up a threshold value in a contamination parameter that can apply for real-time predictions. The isolation forest algorithm has the capacity to scale up to handle extremely large data sizes (e.g., terabytes) and high-dimensional problems with a large number of attributes, some of which may be irrelevant and potential noise. The isolation forest algorithm has relatively low linear time complexity and prevents masking and swamping effects in anomaly detection. A masking effect is where a model predicts normal behavior when the behavior is anomalous. A swamping effect is where a model predicts anomalous behavior when the behavior is normal.

In response to determining that the operation of the one or more edge devices is anomalous, the access control implementation layer 144 of the dynamic access control engine 140 triggers at least one action to control access to the one or more edge devices. The at least one action to control access to an edge device comprises, for example, automatically isolating the edge device from access by a user and/or a device attempting to access the edge device, and/or automatically restricting access privileges of the user and/or the device to the edge device. The user and/or a device attempting to access the edge device may correspond to one or more of the user devices 102. The isolation of the edge device may include, for example, removing the edge device from a network. The restriction of access privileges may include, for example, limiting access to only designated devices or users. The at least one action to control access to an edge device can also or alternatively comprise automatically causing generation and transmission to one or more administrator devices 108 of a message corresponding to the determination that the operation of the one or more edge devices is anomalous. For example, the message may comprise an alert that operations corresponding to an edge device are anomalous (e.g., deviating from normal operational parameters) and remedial actions to prevent unauthorized access by users and/or devices should be taken.

As can be understood from the operational flow 200, the anomaly detection and response 204 is based on the dynamic application of access control policies 203 and contextual decision-making 205 from the policies and decision-making layer 143. For example, determining the action to control access to the one or more edge devices is based at least in part on one or more conditions. The conditions correspond to designated policies about the context of the requests for access to the edge devices. For example, the conditions may include, but are not necessarily limited to, a location from which a request for access to the one or more edge devices originated, a time of the request for access to the one or more edge devices, and an identity of at least one of a user and a device issuing the request for access to the one or more edge devices. For example, one or more policies on which the access control actions are based may specify to allow access from a trusted location during regular working hours, but impose restrictions for access from unfamiliar locations or outside of regular working hours. Another policy may require automatically isolating a device and/or sending an alert to administrators upon detection of sudden spikes in resource usage and/or unusual communication patterns. In another example, a policy may Grant higher access privileges to devices with consistent normal behavior patterns and restrict access for devices exhibiting anomalous behavior.

In illustrative embodiments, the machine learning algorithms used by the normal behavior pattern identification layer 131 and the anomaly detection layer 141 are continuously improved. As an example, the training and feedback layers 132 and 142 use a reinforcement learning model that learns from feedback received from the access control response to various behavior patterns. The feedback can be based on, for example, follow-up data indicating whether a request for access that was deemed to have resulted in anomalous operations was in fact an unauthorized request, follow-up data indicating that anomalous operations were in actuality not anomalous, data from threat intelligence sources 107 regarding conditions or operational parameters associated with determined security threats and/or data from simulations testing the effectiveness of the machine learning models. The machine learning algorithms used by the normal behavior pattern identification layer 131 and the anomaly detection layer 141 can be fine-tuned to adapt access control policies based on the reinforcement learning process, continuously improving the machine learning algorithms' accuracy and effectiveness in identifying anomalies and making access control decisions.

For example, referring to block 207 (machine learning feedback) of the operational flow 200, the testing and validation engine 150 computes accuracy of the one or more machine learning algorithms in determining whether the operation of the one or more edge devices is anomalous. The accuracy computation may be based on, for example, the feedback described hereinabove. The testing and validation engine 150 provides feedback to the one or more machine learning algorithms regarding the accuracy via a feedback loop so that the training and feedback layers 132 and 142 may perform additional training of the one or more machine learning algorithms based at least in part on the accuracy provided via the feedback loop.

In addition, configurations and/or normal operating parameters of edge devices at edge computing sites 105 can be dynamic and subject to regular changes. The data collection engine 120 regularly monitors operational conditions of the edge devices and collects updated operational data associated with the edge devices. As security threats by unauthorized third parties continuously evolve or are continuously introduced, the data collection engine 120 regularly receives and/or collects updated data corresponding to one or more known or new security threats to the one or more edge devices. The receipt and collection of the updated data corresponding to one or more known or new security threats is achieved through integration of the anomaly detection and access control platform 110 with one or more threat intelligence sources 107 (see block 206 of FIG. 2). The updated operational data associated with the edge devices and updated security threat data (e.g., operating parameters, parties, network and resource usage patterns, etc. associated with the security threats) are provided to the training and feedback layers 132 and 142 so that the one or more machine learning algorithms can be re-trained with the updated operational data and/or and updated security threat data.

In illustrative embodiments, the testing and validation engine 150 generates a simulation of anomalous operation of the one or more edge devices. In connection with the simulation, the data collection engine 120 collects data corresponding to the simulation of the anomalous operation of the one or more edge devices. This data is provided to the behavioral analysis engine 130 and to the dynamic access control engine 140 to test the operation of the machine learning algorithms in connection with the identification of the normal operational parameters of the edge devices and the analysis of the data corresponding to the simulated anomalous operation. The testing and validation engine 150 further tests whether the access control implementation layer 144 properly triggers actions to control access to the edge device that is the subject of simulation. For example, the testing and validation engine 150 tests the dynamic application by the access control implementation layer 144 of access control policies 203 and contextual decision-making 205 from the policies and decision-making layer 143. The results of the testing can be fed back to the training and feedback layers 132 and 142 to further train (e.g., fine-tune) the machine learning algorithms used by the normal behavior pattern identification layer 131 and the anomaly detection layer 141 based on the testing results.

The testing and validation engine 150 conducts comprehensive testing to verify the effectiveness of the anomaly detection and access control platform 110 in detecting anomalies and responding appropriately. The testing and validation engine 150 simulates various abnormal behavior patterns and assesses the ability of the anomaly detection and access control platform 110 to accurately detect and respond to these anomalies.

The deployment and maintenance engine 160 continuously monitors the health and security of the system 100 and regularly updates and maintains the components of the anomaly detection and access control platform 110, as well as those of the edge computing sites 105 by pushing and/or pulling updates (e.g., software patches) to the components. The deployment and maintenance engine 160 ensures compatibility between the components by installing needed APIs and addressing any security vulnerabilities that may be uncovered by, for example, the threat intelligence sources 107. The deployment and maintenance engine 160 deploys the data and control agents 106 on the edge devices of the edge computing sites 105, ensuring compatibility and seamless integration, and regularly updates and maintains the data and control agents 106 to address security vulnerabilities and ensure optimal performance.

Figure 3:
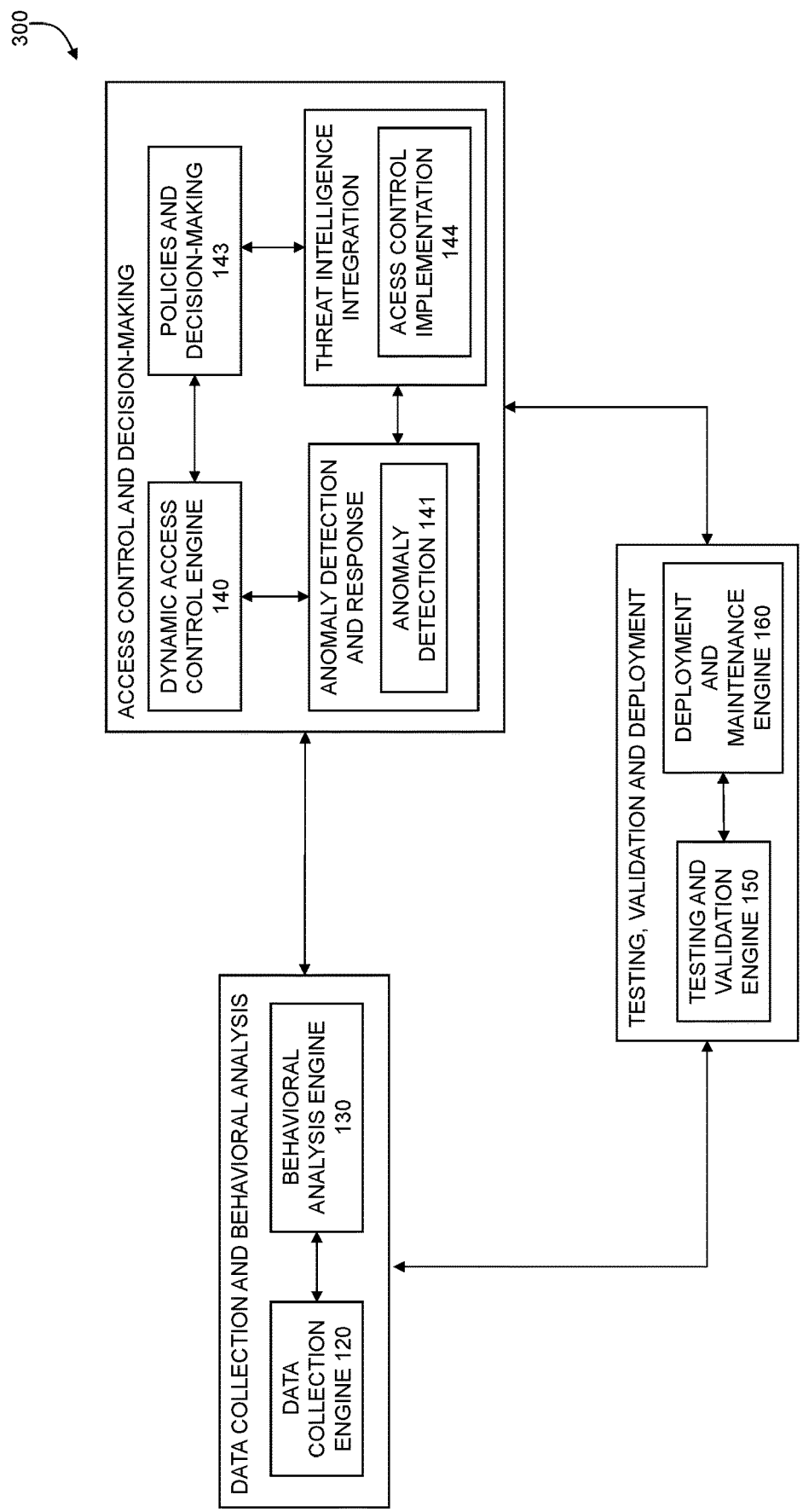
FIG. 3 depicts an operational architecture of components in an anomaly detection and access control platform in an illustrative embodiment.

Referring to the operational architecture 300 in FIG. 3, an end-to-end (E2E) implementation in accordance with an illustrative embodiment includes data collection and behavioral analysis performed by the data collection engine 120 and the behavioral analysis engine 130, which are operatively coupled to the dynamic access control engine 140. The dynamic access control engine 140, including the anomaly detection layer 141, the policies and decision-making layer 143 and the access control implementation layer 144, performs access control and decision-making by detecting and responding to anomalies. The dynamic access control engine 140 performs access control and decision-making with the aid of integrated threat intelligence sources 107. Each of the data collection engine 120, behavioral analysis engine 130 and dynamic access control engine 140 are operatively coupled to the testing and validation engine 150 and the deployment and maintenance engine 160, which are also operatively coupled to each other. In operation, the E2E implementation includes the following steps.

Define Requirements:

Clearly define the objectives and requirements of the anomaly detection and access control platform 110. Define the edge device behavior patterns to monitor and access control policies for the edge devices (e.g., conditions on which to base actions to control access to the edge devices).

Design Architecture:

Design the system architecture with the data collection engine 120, behavioral analysis engine 130, dynamic access control engine 140, testing and validation engine 150 and the deployment and maintenance engine 160.

Data Collection and Preparation:

Set up mechanisms (e.g., data and control agents 106 and data collection engine 120) to collect and prepare device operation data. Collect, for example, resource usage data, network communication patterns and application data from edge devices.

Train Machine Learning Models:

Train machine learning models to identify normal behavior patterns and detect anomalies. Train models using, for example, historical device operational data to identify normal behavior patterns and detect anomalous operations (e.g., deviations from the normal behavior patterns).

Implement Behavioral Analysis Engine:

Implement real-time monitoring of device behavior patterns with an engine that monitors, for example, resource usage, network communication patterns and application-specific behavior.

Develop Dynamic Access Control Policies:

Design policies for the policies and decision-making layer 143 to dynamically adjust access permissions based on determined anomalies. For example, develop policies that limit access for devices exhibiting abnormal behavior patterns.

Incorporate Contextual Decision-Making:

Integrate contextual factors for informed access control decisions. Such factors include, for example, accessing user or device identities, accessing user or device locations and time of access requests.

Implement Anomaly Detection and Response Mechanisms:

Develop mechanisms to detect anomalies and trigger response actions to control edge device access. For example, implement an algorithm that detects sudden spikes in resource usage and triggers an alert.

Integrate with Threat Intelligence Sources:

Establish integration with threat intelligence sources 107 for enhanced security. Integrate the system with threat intelligence feeds to identify known threats associated with edge device operations.

Continuous Improvement and Updates:

Implement mechanisms for continuous enhancement of the system. Continuously update machine learning models with new behavior patterns and emerging threat intelligence.

Test and Validate:

Conduct thorough testing and validation of the implemented system. Test the system with simulated abnormal behavior scenarios and verify the effectiveness of response actions to control access to edge devices.

Deployment and Maintenance:

Deploy the system in the target environment and maintain its operation. For example, deploy the system to edge devices across an organization's network and perform regular updates and maintenance tasks.

According to one or more embodiments, the historical behavior repository 122 and other data repositories or databases referred to herein can be configured according to a relational database management system (RDBMS) (e.g., PostgreSQL). In some embodiments, the historical behavior repository 122 and other data repositories or databases referred to herein are implemented using one or more storage systems or devices associated with the anomaly detection and access control platform 110. In some embodiments, one or more of the storage systems utilized to implement the historical behavior repository 122 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the anomaly detection and access control platform 110, the data collection engine 120, behavioral analysis engine 130, dynamic access control engine 140, testing and validation engine 150 and/or deployment and maintenance engine 160 in other embodiments can be implemented at least in part externally to the anomaly detection and access control platform 110, for example, as stand-alone servers, sets of servers or other types of systems coupled to the network 104. For example, the data collection engine 120, behavioral analysis engine 130, dynamic access control engine 140, testing and validation engine 150 and/or deployment and maintenance engine 160 may be provided as cloud services accessible by the anomaly detection and access control platform 110.

The data collection engine 120, behavioral analysis engine 130, dynamic access control engine 140, testing and validation engine 150 and/or deployment and maintenance engine 160 in the FIG. 1 embodiment are each assumed to be implemented using at least one processing device. Each such processing device generally comprises at least one processor and an associated memory, and implements one or more functional modules for controlling certain features of the data collection engine 120, behavioral analysis engine 130, dynamic access control engine 140, testing and validation engine 150 and/or deployment and maintenance engine 160.

At least portions of the anomaly detection and access control platform 110 and the elements thereof may be implemented at least in part in the form of software that is stored in memory and executed by a processor. The anomaly detection and access control platform 110 and the elements thereof comprise further hardware and software required for running the anomaly detection and access control platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, behavioral analysis engine 130, dynamic access control engine 140, testing and validation engine 150, deployment and maintenance engine 160 and other elements of the anomaly detection and access control platform 110 in the present embodiment are shown as part of the anomaly detection and access control platform 110, at least a portion of the data collection engine 120, behavioral analysis engine 130, dynamic access control engine 140, testing and validation engine 150, deployment and maintenance engine 160 and other elements of the anomaly detection and access control platform 110 in other embodiments may be implemented on one or more other processing platforms that are accessible to the anomaly detection and access control platform 110 over one or more networks. Such elements can each be implemented at least in part within another system element or at least in part utilizing one or more stand-alone elements coupled to the network 104.

It is assumed that the anomaly detection and access control platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, behavioral analysis engine 130, dynamic access control engine 140, testing and validation engine 150, deployment and maintenance engine 160 and other elements of the anomaly detection and access control platform 110, and the elements thereof can each be implemented in the form of one or more LXCs running on one or more VMs. Other arrangements of one or more processing devices of a processing platform can be used to implement the data collection engine 120, behavioral analysis engine 130, dynamic access control engine 140, testing and validation engine 150 and deployment and maintenance engine 160, as well as other elements of the anomaly detection and access control platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the anomaly detection and access control platform 110 to reside in different data centers. Numerous other distributed implementations of the anomaly detection and access control platform 110 are possible.

Accordingly, one or each of the data collection engine 120, behavioral analysis engine 130, dynamic access control engine 140, testing and validation engine 150, deployment and maintenance engine 160 and other elements of the anomaly detection and access control platform 110 can each be implemented in a distributed manner so as to comprise a plurality of distributed elements implemented on respective ones of a plurality of compute nodes of the anomaly detection and access control platform 110.

It is to be appreciated that these and other features of illustrative embodiments are presented by way of example only, and should not be construed as limiting in any way. Accordingly, different numbers, types and arrangements of system elements such as the data collection engine 120, behavioral analysis engine 130, dynamic access control engine 140, testing and validation engine 150, deployment and maintenance engine 160 and other elements of the anomaly detection and access control platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the anomaly detection and access control platform can be offered to cloud infrastructure customers or other users as part of FaaS, CaaS and/or PaaS offerings.

Figure 4:
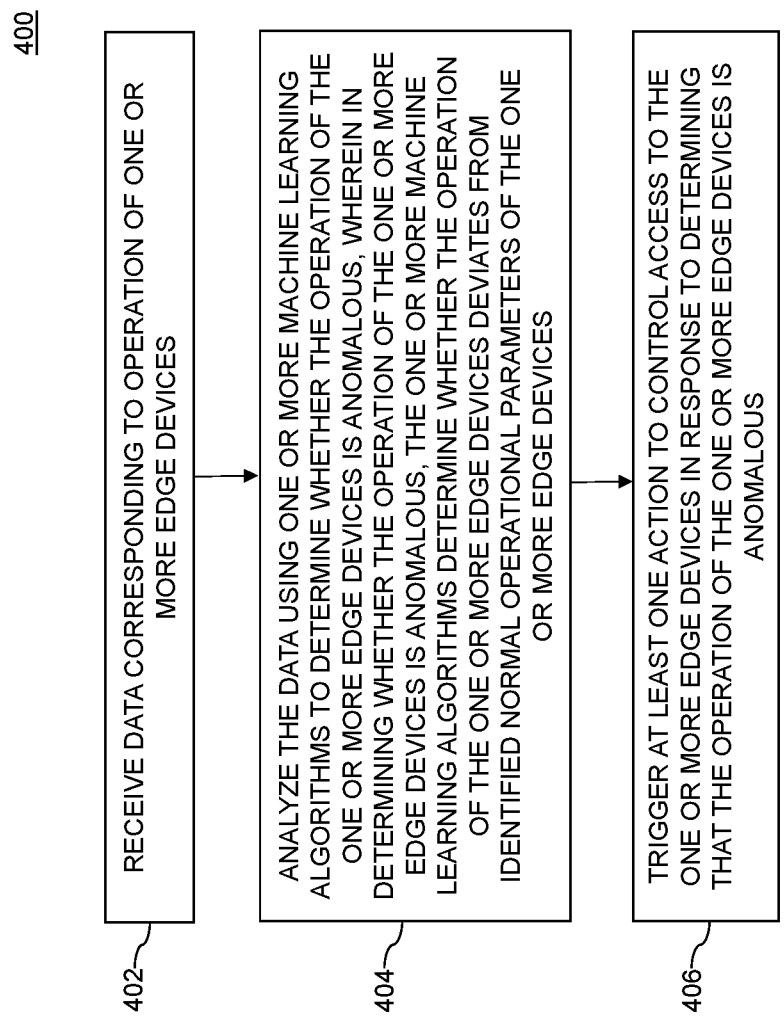
FIG. 4 depicts a process for anomaly detection and access control according to an illustrative embodiment.

The operation of the information processing system 100 will now be described in further detail with reference to the flow diagram of FIG. 4. With reference to FIG. 4, a process 400 for anomaly detection and access control as shown includes steps 402 through 406, and is suitable for use in the system 100 but is more generally applicable to other types of information processing systems comprising an anomaly detection and access control platform configured for detection and resolution of edge device access issues.

In step 402, data corresponding to operation of one or more edge devices is received. In illustrative embodiments, the data corresponding to the operation of the one or more edge devices comprises resource usage data by the one or more edge devices, network communications data associated with the one or more edge devices and/or application execution data of the one or more edge devices.

In step 404, the data is analyzed using one or more machine learning algorithms to determine whether the operation of the one or more edge devices is anomalous. In determining whether the operation of the one or more edge devices is anomalous, the one or more machine learning algorithms determine whether the operation of the one or more edge devices deviates from identified normal operational parameters of the one or more edge devices.

In step 406, at least one action to control access to the one or more edge devices is triggered in response to determining that the operation of the one or more edge devices is anomalous. In illustrative embodiments, the at least one action to control access to the one or more edge devices comprises automatically isolating the one or more edge devices from access by at least one of a user and a device, automatically restricting access privileges of the at least one of the user and the device to the one or more edge devices, and/or automatically causing generation and transmission to one or more administrator devices of a message corresponding to the determination that the operation of the one or more edge devices is anomalous.

In illustrative embodiments, the one or more machine learning algorithms are trained with historical operational data of the one or more edge devices to identify the normal operational parameters of the one or more edge devices. The training can be performed using one or more unsupervised learning techniques, wherein the one or more unsupervised learning techniques comprise a k-means clustering technique.

In illustrative embodiments, the one or more machine learning algorithms are trained with data corresponding to one or more security threats to the one or more edge devices. The one or more machine learning algorithms are re-trained with at least one of updated operational data of the one or more edge devices and updated data corresponding to the one or more security threats to the one or more edge devices.

According to one or more embodiments, the process further comprises determining the at least one action to control access to the one or more edge devices based at least in part on one or more conditions. The one or more conditions comprises, for example, a location from which a request for access to the one or more edge devices originated, a time of the request for access to the one or more edge devices, and/or an identity of at least one of a user and a device issuing the request for access to the one or more edge devices.

According to illustrative embodiments, one more software agents are deployed on the one or more edge devices to monitor the operation of the one or more edge devices, and to collect the data corresponding to the operation of the one or more edge devices.

As noted herein, a simulation of anomalous operation of the one or more edge devices can be generated, wherein data corresponding to the simulation of the anomalous operation of the one or more edge devices is collected. Testing of the analyzing and the triggering of the at least one action based on the collected data corresponding to the simulation of the anomalous operation of the one or more edge devices is performed.

The process may further include computing accuracy of the one or more machine learning algorithms in determining whether the operation of the one or more edge devices is anomalous, providing feedback to the one or more machine learning algorithms regarding the accuracy via a feedback loop, and training the one or more machine learning algorithms based at least in part on the accuracy provided via the feedback loop.

It is to be appreciated that the FIG. 4 process and other features and functionality described above can be adapted for use with other types of information systems configured to execute anomaly detection and access control services in an anomaly detection and access control platform or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an anomaly detection and access control platform as disclosed herein can provide a number of significant advantages relative to conventional arrangements. For example, the anomaly detection and access control platform uses machine learning to proactively mitigate security threats to edge devices before they escalate by identifying anomalies in real-time and triggering immediate responsive actions to control access to the edge devices. The embodiments advantageously leverage unsupervised learning approaches and to detect anomalies in edge device operations. By deploying agents on edge devices, the anomaly detection and access control platform integrates seamlessly with existing edge infrastructures, leverages existing security measures and minimizes disruption during implementation. By integrating with threat intelligence sources, the embodiments ensure continuous support, maintenance, and updates, keeping the system up-to-date with evolving security threats and maintaining its effectiveness over time.

Unlike conventional approaches, the embodiments provide real-time monitoring and adaptive access control based on device behavior and security risks. As an additional advantage, unlike current techniques, illustrative embodiments provide technical solutions which incorporation contextual information (e.g., location of users or devices requesting access, time of access requests, identities of users or devices requesting access) for informed access control decisions.

As an additional advantage, illustrative embodiments simulate abnormal behavior scenarios and evaluate the system's response to verify the effectiveness of the machine learning models in detecting anomalies and responding appropriately. Additionally, the embodiments incorporate machine learning feedback loops to continuously enhance accuracy, adapt behavioral models, and identify emerging security threat patterns.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the anomaly detection and access control platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an anomaly detection and access control platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
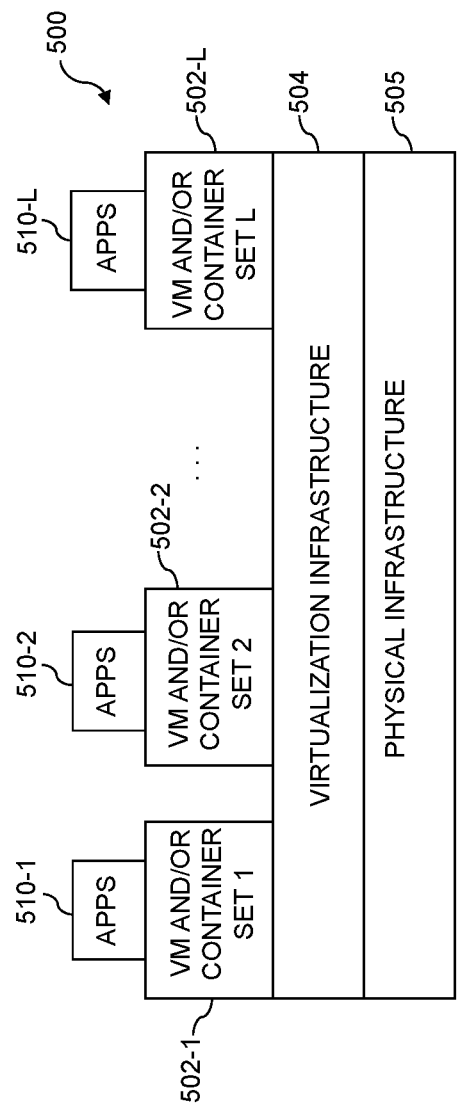
FIGS. 5 and 6 show examples of processing platforms that may be utilized to implement at least a portion of an information processing system according to illustrative embodiments.
Figure 6:
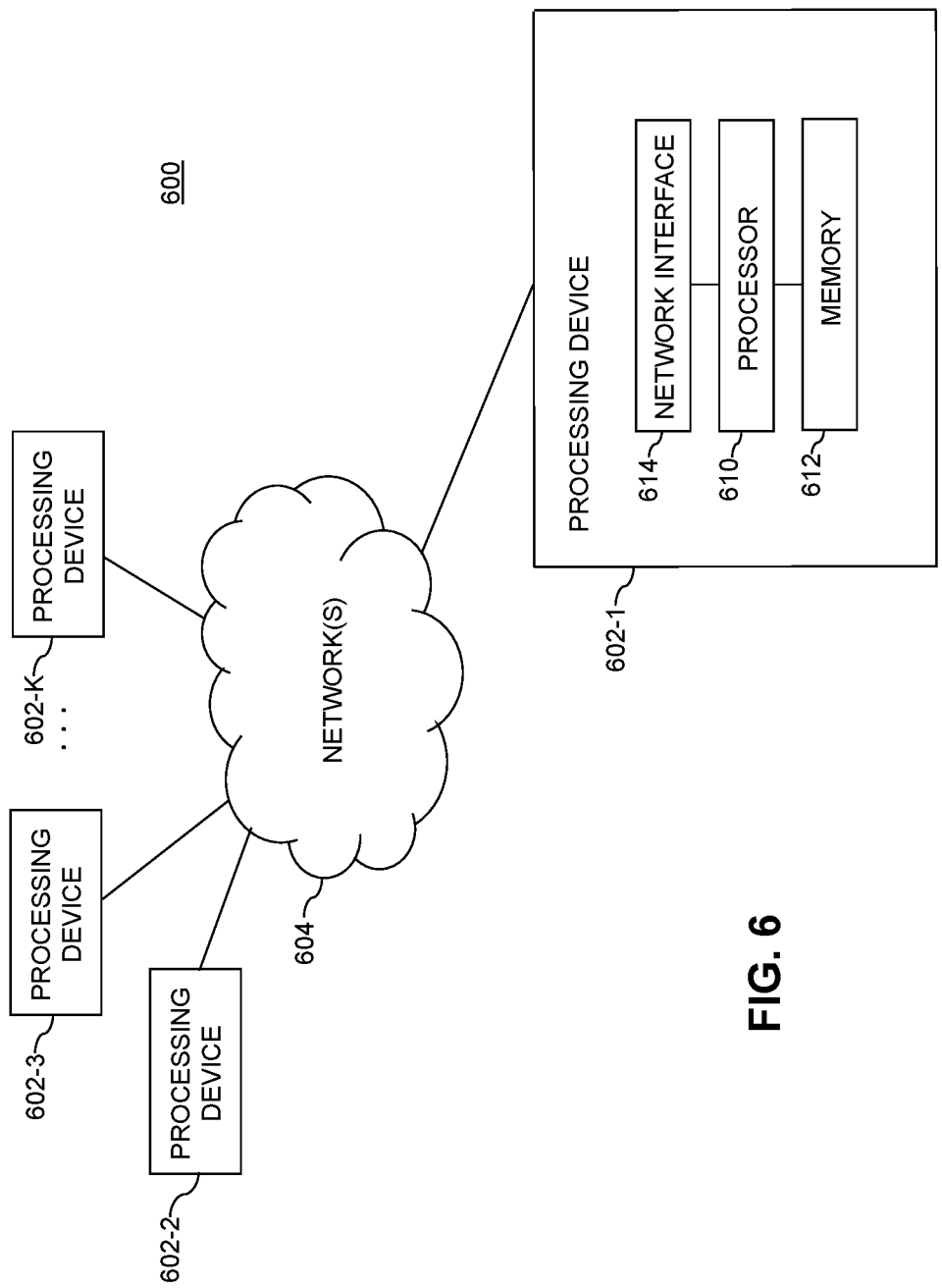

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the anomaly detection and access control platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and anomaly detection and access control platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
training one or more machine learning algorithms with data corresponding to one or more identified security threats associated with one or more edge devices to identify normal operational parameters of the one or more edge devices and to identify anomalous operational parameters of the one or more edge devices, wherein the data corresponding to the one or more identified security threats associated with the one or more edge devices comprises one or more of descriptions, effects and signs of the one or more identified security threats in the one or more edge devices, origins of the one or more identified security threats, and methods by which the one or more identified security threats are implemented in the one or more edge devices;
receiving data corresponding to operation of one or more edge devices, the data corresponding to the operation of the one or more edge devices comprising at least a request for access to the one or more edge devices;
analyzing the data using the one or more machine learning algorithms to determine whether the operation of the one or more edge devices is anomalous, wherein in determining whether the operation of the one or more edge devices is anomalous, the one or more machine learning algorithms determine whether the operation of the one or more edge devices deviates from identified normal operational parameters of the one or more edge devices and whether the deviations from the identified normal operational parameters of the one or more edge devices matches the identified anomalous operational parameters;
upon determining that the operation of the one or more edge devices is anomalous by the one or more machine learning algorithms, automatically triggering at least one action to control access to the one or more edge devices based on applying one or more policies to the request for access to the one or more edge devices of the data corresponding to the operation of the one or more edge devices;
iteratively computing accuracy of the one or more machine learning algorithms in determining whether the operation of the one or more edge devices is anomalous;
providing feedback to the one or more machine learning algorithms regarding the accuracy via a feedback loop;
iteratively re-training the one or more machine learning algorithms based at least in part on the accuracy provided via the feedback loop; and
iteratively adapting the one or more policies based at least in part on the accuracy provided via the feedback loop;
wherein the steps of the method are executed by a processing device operatively coupled to a memory.

2. The method of claim 1, further comprising further training the one or more machine learning algorithms with historical operational data of the one or more edge devices to identify the normal operational parameters of the one or more edge devices.

3. The method of claim 2, wherein the training is performed using one or more unsupervised learning techniques.

4. The method of claim 3, wherein the one or more unsupervised learning techniques comprise a k-means clustering technique.

5. The method of claim 1, further comprising further re-training the one or more machine learning algorithms with at least one of updated operational data of the one or more edge devices and updated data corresponding to the one or more security threats to the one or more edge devices.

6. The method of claim 1, the one or more policies comprising at least one of a location from which a request for access to the one or more edge devices originated, a time of the request for access to the one or more edge devices, and an identity of at least one of a user and a device issuing the request for access to the one or more edge devices.

7. The method of claim 1, wherein the at least one action to control access to the one or more edge devices comprises at least one of automatically isolating the one or more edge devices from access by at least one of a user and a device and automatically restricting access privileges of the at least one of the user and the device to the one or more edge devices.

8. The method of claim 1, wherein the at least one action to control access to the one or more edge devices comprises automatically causing generation and transmission to one or more administrator devices of a message corresponding to the determination that the operation of the one or more edge devices is anomalous.

9. The method of claim 1, wherein the data corresponding to the operation of the one or more edge devices comprises at least one of resource usage data by the one or more edge devices, network communications data associated with the one or more edge devices and application execution data of the one or more edge devices.

10. The method of claim 1, further comprising deploying one more software agents on the one or more edge devices to monitor the operation of the one or more edge devices, and to collect the data corresponding to the operation of the one or more edge devices.

11. The method of claim 1, further comprising validating the re-trained one or more machine learning algorithms by:
generating a simulation of anomalous operation of the one or more edge devices;
collecting data corresponding to the simulation of the anomalous operation of the one or more edge devices; and
testing the analyzing and the automatic triggering of the at least one action based on the collected data corresponding to the simulation of the anomalous operation of the one or more edge devices.

12. The method of claim 1, wherein the one or more machine learning algorithms comprise a decision tree algorithm.

13. An apparatus comprising:
a processing device operatively coupled to a memory and configured:
to train one or more machine learning algorithms with data corresponding to one or more identified security threats associated with one or more edge devices to identify normal operational parameters of the one or more edge devices and to identify anomalous operational parameters of the one or more edge devices, wherein the data corresponding to the one or more identified security threats associated with the one or more edge devices comprises one or more of descriptions, effects and signs of the one or more identified security threats in the one or more edge devices, origins of the one or more identified security threats, and methods by which the one or more identified security threats are implemented in the one or more edge devices;
to receive data corresponding to operation of one or more edge devices, the data corresponding to the operation of the one or more edge devices comprising at least a request for access to the one or more edge devices;
to analyze the data using the one or more machine learning algorithms to determine whether the operation of the one or more edge devices is anomalous, wherein in determining whether the operation of the one or more edge devices is anomalous, the one or more machine learning algorithms determine whether the operation of the one or more edge devices deviates from identified normal operational parameters of the one or more edge devices and whether the deviations from the identified normal operational parameters of the one or more edge devices matches the identified anomalous operational parameters;
upon determining that the operation of the one or more edge devices is anomalous by the one or more machine learning algorithms, to automatically trigger at least one action to control access to the one or more edge devices based on applying one or more policies to the request for access to the one or more edge devices of the data corresponding to the operation of the one or more edge devices;
to iteratively compute accuracy of the one or more machine learning algorithms in determining whether the operation of the one or more edge devices is anomalous;
to provide feedback to the one or more machine learning algorithms regarding the accuracy via a feedback loop;
to iteratively re-train the one or more machine learning algorithms based at least in part on the accuracy provided via the feedback loop; and
to iteratively adapt the one or more policies based at least in part on the accuracy provided via the feedback loop.

14. The apparatus of claim 13, the one or more policies comprising at least one of a location from which a request for access to the one or more edge devices originated, a time of the request for access to the one or more edge devices, and an identity of at least one of a user and a device issuing the request for access to the one or more edge devices.

15. The apparatus of claim 13, wherein the at least one action to control access to the one or more edge devices comprises at least one of automatically isolating the one or more edge devices from access by at least one of a user and a device and automatically restricting access privileges of the at least one of the user and the device to the one or more edge devices.

16. An article of manufacture comprising a non-transitory processor-readable storage medium having stored therein program code of one or more software programs, wherein the program code when executed by at least one processing device causes said at least one processing device to perform the steps of:
training one or more machine learning algorithms with data corresponding to one or more identified security threats associated with one or more edge devices to identify normal operational parameters of the one or more edge devices and to identify anomalous operational parameters of the one or more edge devices, wherein the data corresponding to the one or more identified security threats associated with the one or more edge devices comprises one or more of descriptions, effects and signs of the one or more identified security threats in the one or more edge devices, origins of the one or more identified security threats, and methods by which the one or more identified security threats are implemented in the one or more edge devices;
receiving data corresponding to operation of one or more edge devices, the data corresponding to the operation of the one or more edge devices comprising at least a request for access to the one or more edge devices;

analyzing the data using the one or more machine learning algorithms to determine whether the operation of the one or more edge devices is anomalous, wherein in determining whether the operation of the one or more edge devices is anomalous, the one or more machine learning algorithms determine whether the operation of the one or more edge devices deviates from identified normal operational parameters of the one or more edge devices and whether the deviations from the identified normal operational parameters of the one or more edge devices matches the identified anomalous operational parameters;

upon determining that the operation of the one or more edge devices is anomalous by the one or more machine learning algorithms, automatically triggering at least one action to control access to the one or more edge devices based on applying one or more policies to the request for access to the one or more edge devices of the data corresponding to the operation of the one or more edge devices;

iteratively computing accuracy of the one or more machine learning algorithms in determining whether the operation of the one or more edge devices is anomalous;

providing feedback to the one or more machine learning algorithms regarding the accuracy via a feedback loop;

iteratively re-training the one or more machine learning algorithms based at least in part on the accuracy provided via the feedback loop; and iteratively adapting the one or more policies based at least in part on the accuracy provided via the feedback loop.

17. The article of manufacture of claim 16, the one or more policies comprising at least one of a location from which a request for access to the one or more edge devices originated, a time of the request for access to the one or more edge devices, and an identity of at least one of a user and a device issuing the request for access to the one or more edge devices.

18. The article of manufacture of claim 16, wherein the at least one action to control access to the one or more edge devices comprises at least one of automatically isolating the one or more edge devices from access by at least one of a user and a device and automatically restricting access privileges of the at least one of the user and the device to the one or more edge devices.

19. The apparatus of claim 13, wherein the processing device is further configured to validate the re-trained one or more machine learning algorithms by:

generating a simulation of anomalous operation of the one or more edge devices;

collecting data corresponding to the simulation of the anomalous operation of the one or more edge devices; and testing the analyzing and the automatic triggering of the at least one action based on the collected data corresponding to the simulation of the anomalous operation of the one or more edge devices.

20. The article of manufacture of claim 16, wherein the program code further causes said at least one processing device to perform the step of validating the re-trained one or more machine learning algorithms by:

generating a simulation of anomalous operation of the one or more edge devices;

collecting data corresponding to the simulation of the anomalous operation of the one or more edge devices; and testing the analyzing and the automatic triggering of the at least one action based on the collected data corresponding to the simulation of the anomalous operation of the one or more edge devices.

\* \* \* \* \*